(12) United States Patent
Tomofuji et al.

(10) Patent No.: US 8,775,873 B2
(45) Date of Patent: Jul. 8, 2014

(54) DATA PROCESSING APPARATUS THAT PERFORMS TEST VALIDATION AND COMPUTER-READABLE STORAGE MEDIUM

(75) Inventors: Masao Tomofuji, Kawasaki (JP); Shigeo Yoshikawa, Kawasaki (JP); Minoru Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 239 days.

(21) Appl. No.: 13/343,765

(22) Filed: Jan. 5, 2012

(65) Prior Publication Data
US 2012/0192011 A1    Jul. 26, 2012

(30) Foreign Application Priority Data
Jan. 25, 2011    (JP) ................................ 2011-013176

(51) Int. Cl.
*G06F 11/00*    (2006.01)

(52) U.S. Cl.
USPC ............................................. 714/32; 714/21

(58) Field of Classification Search
USPC ............................ 714/32, 33, 21, 25, 100, 30
See application file for complete search history.

(56) References Cited

U.S. PATENT DOCUMENTS

| | | | |
|---|---|---|---|
| 8,214,329 B2 * | 7/2012 | Gilder et al. | 707/622 |
| 2005/0138309 A1 * | 6/2005 | Hiraiwa et al. | 711/162 |
| 2006/0004729 A1 * | 1/2006 | Zhilyaev et al. | 707/3 |

FOREIGN PATENT DOCUMENTS

JP    2001-51875 A    2/2001

* cited by examiner

*Primary Examiner* — Dieu-Minh Le
(74) *Attorney, Agent, or Firm* — Fujitsu Patent Center (57) ABSTRACT

In a data processing apparatus, when an instruction for starting validation is provided, or when definition information is updated, data input from a data source is collected, and a process for narrowing down of the collected data is executed. In the data narrowing process, by extracting records and items as process targets according to the definition information that defines the operation of the apparatus, the number of data items used for validation is reduced. Then, the operation is validated using the narrowed data. In the operation validation process, a virtual transfer destination of output of data is provided within the apparatus, and the data is output to the virtual transfer destination, for comparison with the output data, whereby the validation of the operation is performed.

5 Claims, 13 Drawing Sheets

FIG. 1

```
<dataflow>
    <flowcont>
      <seqno>1<seqno>
      <cnvseq> ITEM CONDITIONAL STATEMENT 1 <cnvseq>    ITEM CONDITION
    </flowcont>
    <flowcont>
      <seqno>2<seqno>
      <cnvseq> ITEM SELECTION 1<cnvseq>    ; ITEM SELECTION
    </flowcont>
    <flowcont>
      <seqno>3<seqno>
      <cnvseq> CLASSIFICATION 1 <cnvseq>    ; CLASSIFICATION
    </flowcont>
      <seqno>4<seqno>
      <cnvseq> CODE CONVERSION 1 <cnvseq>    ; CODE CONVERSION
    </flowcont>
</dataflow>
```

```
<conv_section>
  <conv_info>
    <cnvseq> ITEM CONDITIONAL STATEMENT 1 <cnvseq>
    <convcont>
      <cond>sel"colm_1=" MALE""<cond>     ; DETAILS OF ITEM CONDITION
    </convcont>
  </conv_info>

<conv_info>
    <cnvseq> ITEM SELECTION 1 <cnvseq>
    <convcont>
      <outcolm>1,2,3,4,5<cond>            ; TARGET ITEM OF ITEM SELECTION
    </convcont>
  </conv_info>

<conv_info>
    <cnvseq> CLASSIFICATION 1 <cnvseq>
    <convcont>
      <cond>sel">colm_3>100"<cond>        ; DETAILS OF CLASSIFICATION CONDITION
    </convcont>
  </conv_info>

<conv_info>
    <cnvseq> CODE CONVERSION 1 <cnvseq>
    <convcont>
      <incode>SJIS<incode>                ; DETAILS OF CODE CONVERSION
      <outcode>UTF8<outcode>
    </convcont>
  </conv_info>
</conv_section>
```

| RULE | CONVERSION TYPE | NARROWING RULE | REMARK |
|---|---|---|---|
| 001 | ·CODE CONVERSION<br>·SORTING<br>·TOTALIZATION | ONLY 50 RECORDS FROM HEAD ARE PROCESS TARGETS | CONVERSION TYPE FOR CONVERTING ALL ITEMS/ALL RECORDS |
| 002 | ·ITEM EDITION<br>·ITEM SELECTION | ONLY SPECIFIC ITEMS ARE PROCESS TARGETS | CONVERSION TYPE FOR CONVERTING ONLY SPECIFIC ITEMS |
| 003 | ·CLASSIFICATION<br>·ITEM CONDITIONAL STATEMENT | ONLY SPECIFIC RECORDS ARE PROCESS TARGETS | CONVERSION TYPE FOR CONVERTING ONLY SPECIFIC RECORDS |

| SERIAL NUMBER | CONVERSION TYPE | PARAMETER |
|---|---|---|
| 1 | | |
| 2 | | |
| ⋮ | | |

FIG. 9B

| INPUT RECORD NUMBER UPPER LIMIT FLAG | OFF |
|---|---|

FIG. 9C

| INPUT ITEM | 1 | 2 | 3 | 4 | 5 | 6 | 7 | 8 | ... |
|---|---|---|---|---|---|---|---|---|---|
| OUTPUT TARGET ITEM FLAG | ON | ON | ON | ON | ON | ON | ON | ON | ... |

FIG. 9D

| SEARCH TARGET ITEM | | |
|---|---|---|
| RECORD SEARCH CONDITION | | |

FIG. 10A

| SERIAL NUMBER | CONVERSION TYPE | PARAMETER |
|---|---|---|
| 1 | ITEM CONDITION | sel "colm_1= "MALE"" |
| 2 | ITEM SELECTION | 1, 2, 3, 4, 5 |
| 3 | CLASSIFICATION | sel ">colm_3>100" |
| 4 | CODE CONVERSION | — |

FIG. 10B

| INPUT RECORD NUMBER UPPER LIMIT FLAG | OFF |
|---|---|

FIG. 10C

| INPUT ITEM | 1 | 2 | 3 | 4 | 5 | 6 | 7 | 8 | 9 | ... |
|---|---|---|---|---|---|---|---|---|---|---|
| OUTPUT TARGET ITEM FLAG | ON | ON | ON | ON | ON | OFF | OFF | OFF | OFF | ... |

FIG. 10D

| SEARCH TARGET ITEM | 1 | 3 |
|---|---|---|
| RECORD SEARCH CONDITION | X = "MALE" | X > 100 |

FIG. 11A

| RECORD NUMBER | ITEM | | | | | | | | | |
|---|---|---|---|---|---|---|---|---|---|---|
| 00001 | MALE | 25 | 90 | A | P28 | UN-MARRIED | 001 | OFFICE WORKER | 04 | 311 |
| 00002 | FE-MALE | 32 | 95 | A | P26 | MARRIED | 004 | OFFICE WORKER | 04 | 311 |
| 00003 | MALE | 25 | 101 | B | P28 | UN-MARRIED | 003 | OFFICE WORKER | 04 | 311 |
| ⋮ | ⋮ | ⋮ | ⋮ | ⋮ | ⋮ | ⋮ | ⋮ | ⋮ | ⋮ | ⋮ |
| 10001 | MALE | 48 | 98 | B | P28 | MARRIED | 021 | OFFICE WORKER | 04 | 311 |

FIG. 11B

| RECORD NUMBER | ITEM | | | | | | | | | |
|---|---|---|---|---|---|---|---|---|---|---|
| 00001 | MALE | 25 | 90 | A | P28 | UN-MARRIED | 001 | OFFICE WORKER | 04 | 311 |
| 00002 | FE-MALE | 32 | 95 | A | P26 | MARRIED | 004 | OFFICE WORKER | 04 | 311 |
| 00003 | MALE | 25 | 101 | B | P28 | UN-MARRIED | 003 | OFFICE WORKER | 04 | 311 |
| ⋮ | ⋮ | ⋮ | ⋮ | ⋮ | ⋮ | ⋮ | ⋮ | ⋮ | ⋮ | ⋮ |
| 00050 | FE-MALE | 26 | 91 | A | P26 | UN-MARRIED | 045 | OFFICE WORKER | 04 | 311 |

FIG. 12A

| RECORD NUMBER | ITEM | | | | | | | | | |
|---|---|---|---|---|---|---|---|---|---|---|
| 00001 | MALE | 25 | 90 | A | P28 | UN-MARRIED | 001 | OFFICE WORKER | 04 | 311 |
| 00002 | FE-MALE | 32 | 95 | A | P26 | MARRIED | 004 | OFFICE WORKER | 04 | 311 |
| 00003 | MALE | 25 | 101 | B | P28 | UN-MARRIED | 003 | OFFICE WORKER | 04 | 311 |
| ⋮ | ⋮ | ⋮ | ⋮ | ⋮ | ⋮ | ⋮ | ⋮ | ⋮ | ⋮ | ⋮ |
| 10001 | MALE | 48 | 98 | B | P28 | MARRIED | 021 | OFFICE WORKER | 04 | 311 |

FIG. 12B

| INPUT ITEM | 1 | 2 | 3 | 4 | 5 | 6 | 7 | 8 | 9 | ⋯ |
|---|---|---|---|---|---|---|---|---|---|---|
| OUTPUT TARGET ITEM FLAG | ON | ON | ON | ON | ON | OFF | OFF | OFF | OFF | ⋯ |

FIG. 12C

| SEARCH TARGET ITEM | 1 | 3 |
|---|---|---|
| RECORD SEARCH CONDITION | X = "MALE" | X > 100 |

FIG. 12D

| RECORD NUMBER | ITEM | | | | |
|---|---|---|---|---|---|
| 00003 | MALE | 25 | 101 | B | P28 |
| 00012 | MALE | 32 | 102 | A | P26 |
| 00018 | MALE | 25 | 101 | B | P28 |
| ⋮ | ⋮ | ⋮ | ⋮ | ⋮ | ⋮ |
| 09720 | MALE | 26 | 112 | A | P28 |

FIG. 13

DATA PROCESSING APPARATUS THAT PERFORMS TEST VALIDATION AND COMPUTER-READABLE STORAGE MEDIUM

CROSS-REFERENCE TO RELATED APPLICATION

This application is based upon and claims the benefit of priority of the prior Japanese Patent Application No. 2011-013176, filed on Jan. 25, 2011, the entire contents of which are incorporated herein by reference.

FIELD

The embodiment discussed herein is related to a data processing apparatus that performs test validation during operation of the data processing apparatus and a computer-readable storage medium.

BACKGROUND

It is sometimes necessary to validate an operational definition while in operation on a single operational server using the same data that is used in the actual operation. In such a case, an administrator carefully performs validation by changing an output destination so as to prevent data processed by the actual operation from being updated or deleted by validation data processed by the validation, and inserting a pause (sleep) between validation process steps to thereby prevent an increase in CPU utilization such that the validation operation does not disturb the actual operation.

Further, as a technique for validating the operation of various kinds of apparatuses, such as a computer and a server apparatus, there has been proposed a technique that virtually performs operational validation using a program which simulates the operation of a target apparatus. For example, there has been proposed a software testing apparatus that includes an execution unit which executes the above-mentioned program and a setting unit which sets conditions for the execution unit, and performs virtual testing by comparing expected values determined from the set conditions with output values from the execution unit (see e.g. Japanese Laid-Open Patent Publication No. 2001-51875).

In a case where the same operational definition as that for the actual operation is validated on one operational server while in operation, the operational server is controlled such that the CPU utilization is not increased, which causes a problem that it takes a long time to process the validation data. Further, since the output destination of the validation data is changed, it is impossible to check an operation when the actual output data is output to the output destination thereof. Further, to virtually perform the operational validation, definitions need to be prepared for the virtual validation purposes. Further, there is a problem that it is impossible to check an operation when the actual output data is output to the output destination thereof.

SUMMARY

According to an aspect of the invention, a data processing apparatus includes: a memory configured to store definition information that defines an operation of the data processing apparatus and rules for narrowing down data; and one or more processors configured to perform a procedure including narrowing down received data based on the definition information and the rules for narrowing down data, to generate test input data, and processing the test input data according to the definition information to generate output data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present invention will be explained below with reference to the accompanying drawings, wherein like reference numerals refer to like elements throughout.

Figure 1:
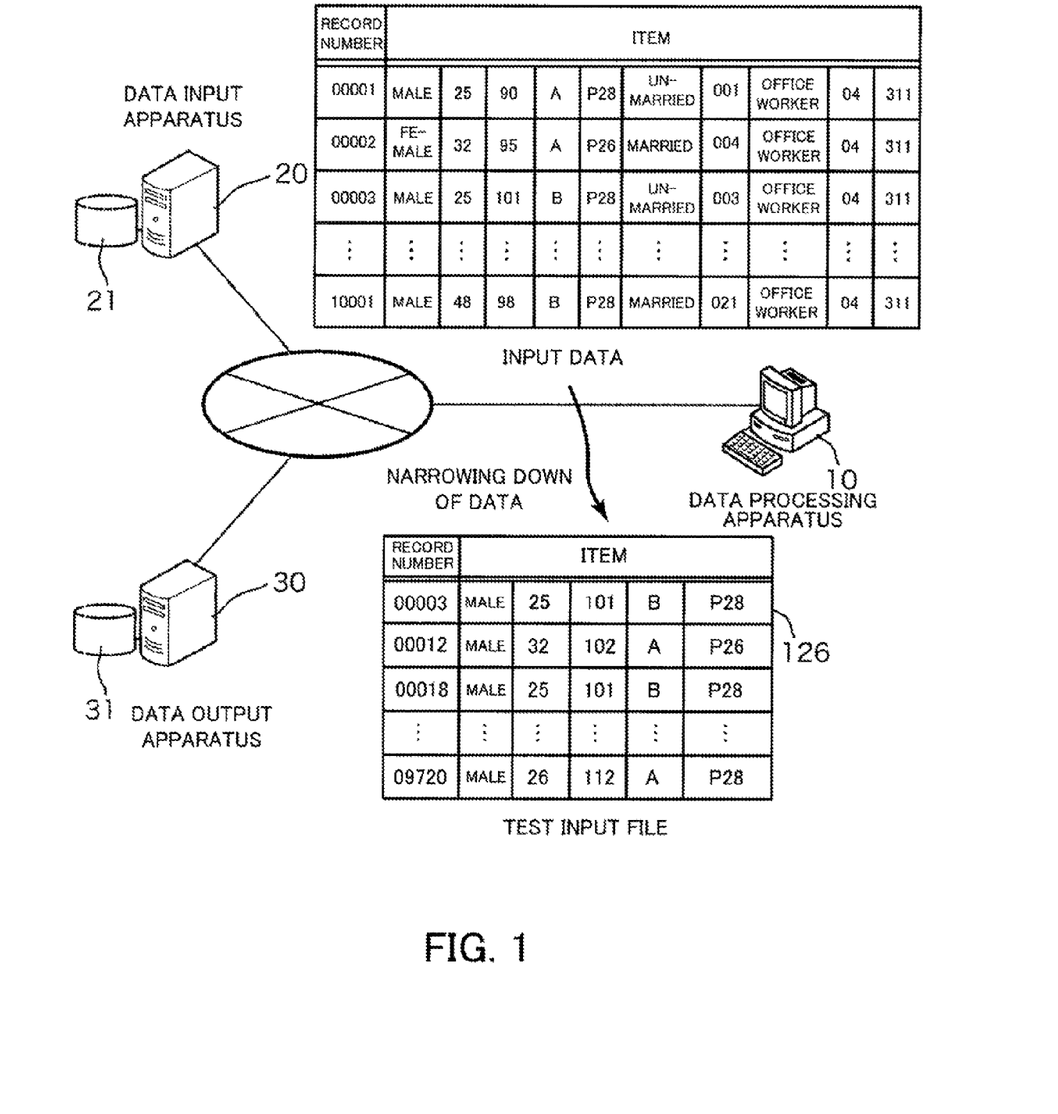
FIG. 1 schematically illustrates the entire arrangement of a processing system according to the present embodiment.

FIG. 1 schematically illustrates the entire arrangement of a processing system according to the present embodiment. The processing system illustrated in FIG. 1 includes a data input apparatus 20, a data processing apparatus 10, and a data output apparatus 30. The data input apparatus 20 is an apparatus, such as a computer or a server, including a data source 21, such as a database and files, for storing various items of data, and transmits data which is stored in itself or is generated by itself to the data processing apparatus 10.

The data processing apparatus 10 is an apparatus for processing data input from the data input apparatus 20, and outputting the processed data to the data output apparatus 30. It is assumed that the data input from the data input apparatus 20 is formed e.g. by a plurality of records, each of which includes a plurality of items. The data processing apparatus 10 executes various kinds of data processing, such as code conversion, sorting, counting, item editing, item selection, and classification.

Further, the data processing apparatus 10 stores definition information 122 (see FIG. 4) which defines the operation of the data processing apparatus. In the definition information 122, there is described information including the details and procedure of one or a plurality of data processing operations to be executed by the data processing apparatus, a data source from which data is acquired, and an output destination of data, and the data processing apparatus 10 performs its own operation by processing data according to the definition information 122.

Figure 2:
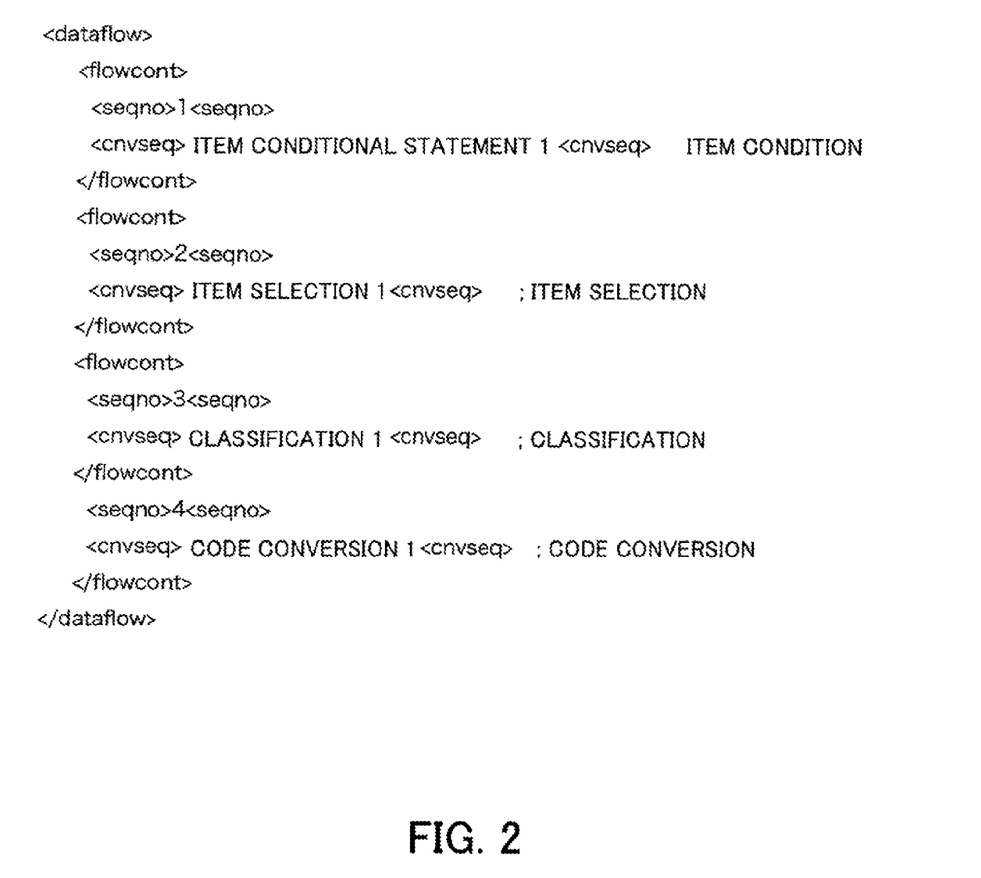
FIG. 2 illustrates an example of the details of a process described in definition information.
Figure 3:
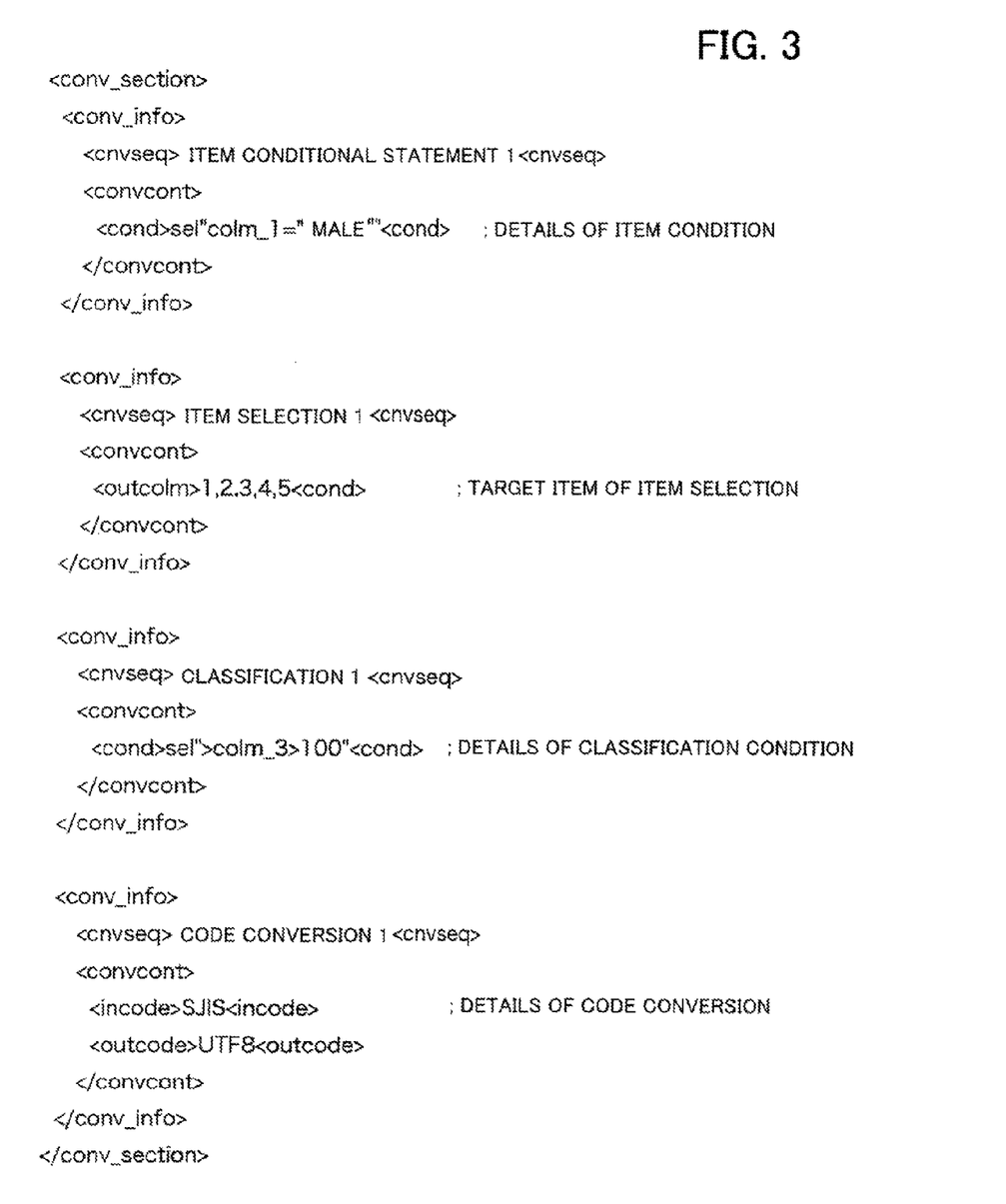
FIG. 3 illustrates an example of the details of a process described in the definition information.

FIGS. 2 and 3 illustrate examples of the details of processes described in the definition information 122. FIG. 2 illustrates the details of a process described in definition information 122. The example illustrated in FIG. 2 includes processing for extracting records satisfying item conditions, item selection for selecting only items designated from the records, classification for extracting records satisfying conditions of designated items, and code conversion for converting the code of each designated item.

FIG. 3 illustrates examples of details of processes. A first processing detail indicates that a record containing a character string "male" in a first item is extracted. A second processing detail indicates that first to fifth items are selected out of the items included in each record. A third processing detail indicates that a record having a value of the third item larger than 100 is extracted. A fourth processing detail indicates that a character code of character strings written in each item is converted from SJIS to UTF8.

The data processing apparatus 10 performs processing on data input from the data input apparatus 20 for extracting records satisfying an item condition, selecting items, classifying items, code conversion, and so forth, according to the above-described definition information 122, and outputs the converted data to the data output apparatus 30.

The data output apparatus 30 is a computer, a server or the like apparatus, which has a data target 31, such as a database and files, for storing data output from the data processing apparatus 10.

The data input apparatus 20 and the data output apparatus 30 are connected to the data processing apparatus 10 e.g. via a communication network. Note that the data input apparatus 20 and the data output apparatus 30 connected to the data processing apparatus 10 are each not limited in number to one, but may be each a plurality in number.

In the present embodiment, the data processing apparatus 10 functions not only as an operational server that operates according to the definition information 122, but also as a validation server that validates the definition information of the data processing apparatus without affecting tasks and processes in operation. In the validation of the operation definition, the data processing apparatus 10 narrows down data (creates a test input file 126, described hereinafter) based on the definition information and a narrowing rule table, described hereinafter, and performs validation of the definition information by performing the above-mentioned conversion process.

Figure 4:
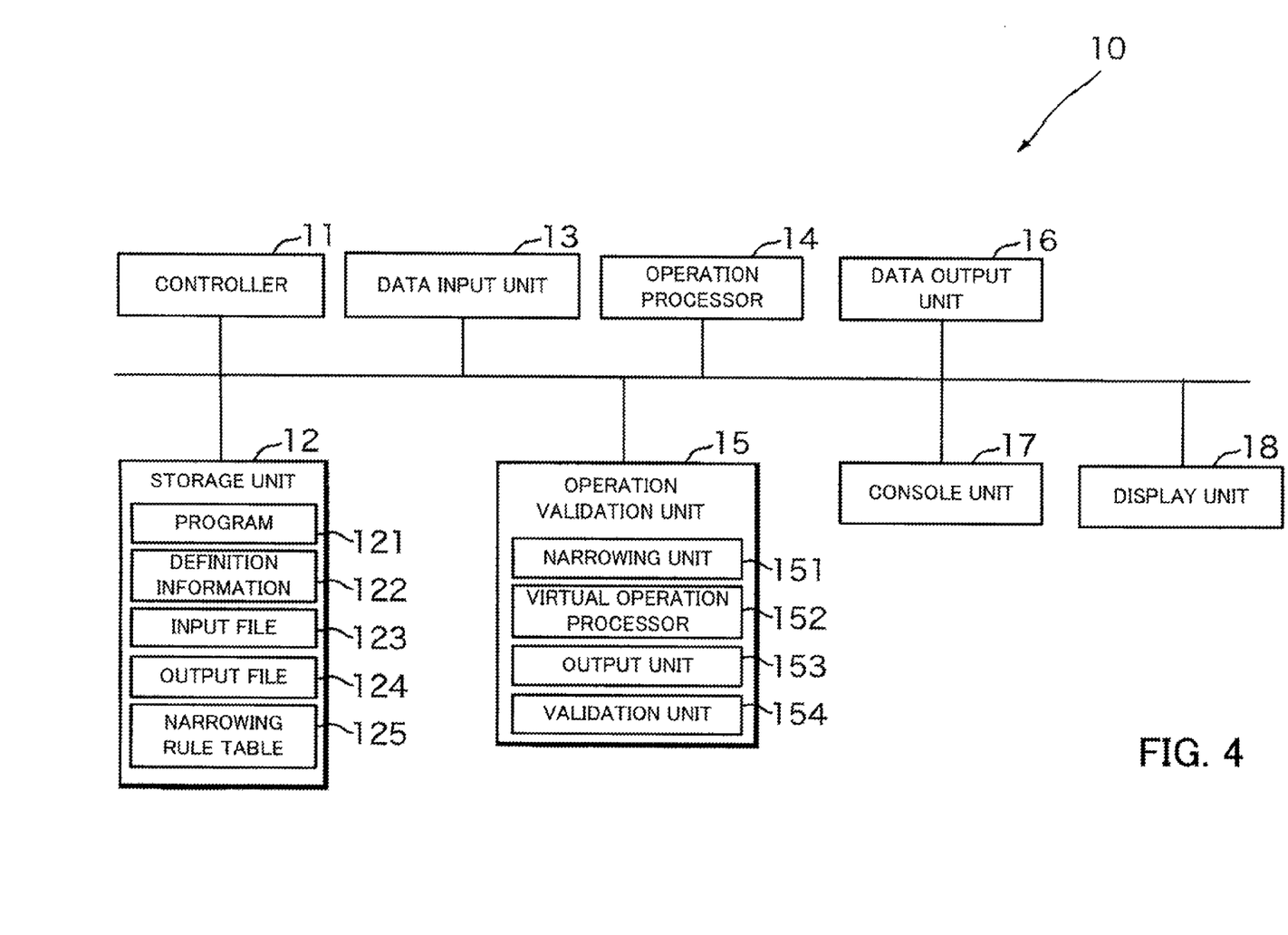
FIG. 4 is a block diagram illustrating the internal configuration of a data processing apparatus.

FIG. 4 is a block diagram illustrating the internal configuration of the data processing apparatus 10. The data processing apparatus 10 comprises a controller 11, a storage unit 12, a data input unit 13, an operation processor 14, an operation validation unit 15, a data output unit 16, a console unit 17, and a display unit 18.

The controller 11 includes e.g. a MPU (micro processing unit), a ROM (read only memory), and a RAM (random access memory). The storage unit 12 is e.g. a HDD (hard disk drive) or a flash memory, and stores a computer program (program 121) of the present embodiment, the above-described definition information 122, an input file 123 which records data collected from the data input apparatus 20, an output file 124 which records data used for validation of the operation definition, a narrowing rule table 125 which defines rules for narrowing down data, and so forth.

The controller 11 reads the program 121 from the storage unit 12 and executes the same to thereby control the operations of the above-mentioned units of hardware.

The data input unit 13 is an input interface for inputting data sent from the data input apparatus 20. The data output unit 16 is an output interface for outputting data to the data output apparatus 30.

The operation processor 14 executes processing for operating the data processing apparatus according to the definition information 122. As described above, in the definition information 122, there is described information including the details and procedure of one or a plurality of data processing operations to be executed by the data processing apparatus, a data source from which data is acquired, and an output destination of data. The operation processor 14 processes data input via the data input unit 13 according to the details and procedure of the processing (process flow) described in the definition information 122. Further, the operation processor 14 sends the processed data to the data output unit 16, and outputs the processed data to the output destination set forth in the definition information 122 via the data output unit 16.

The operation validation unit 15 is a processor which executes processing for validating the operation of the data processing apparatus (operation validation process) according to the definition information 122, and includes a narrowing unit 151, a virtual operation processor 152, an output unit 153, and a validation unit 154. In the present embodiment, the narrowing unit 151 performs processing for narrowing down input data. After limiting the amount of data, the virtual operation processor 152 processes the data according to the definition information 122 similarly to the operation processor 14, and generates the processed data as the output file 124. The output unit 153 outputs the output file 124 generated by the virtual operation processor 152 to a virtual transfer destination provided within the apparatus. The validation unit 154 makes it possible to compare the data recorded in the input file 123 with the output file output to the virtual transfer destination to validate whether or not the operation according to the definition information 122 is good.

The console unit 17 is an input device, such as a keyboard and a mouse, for receiving operation instructions from an administrator of the data processing apparatus 10. The display unit 18 is a display device, such as a liquid crystal display which displays information to be notified to the administrator or the like, results of processing performed in the operation processor 14 and the operation validation unit 15, and so forth.

Note that in a case where the data processing apparatus 10 is configured to be capable of performing the remote operation and displaying various pieces of information via a communication network or the like, the data processing apparatus 10 may not be equipped with the console unit 17 or the display unit 18.

Figure 5:
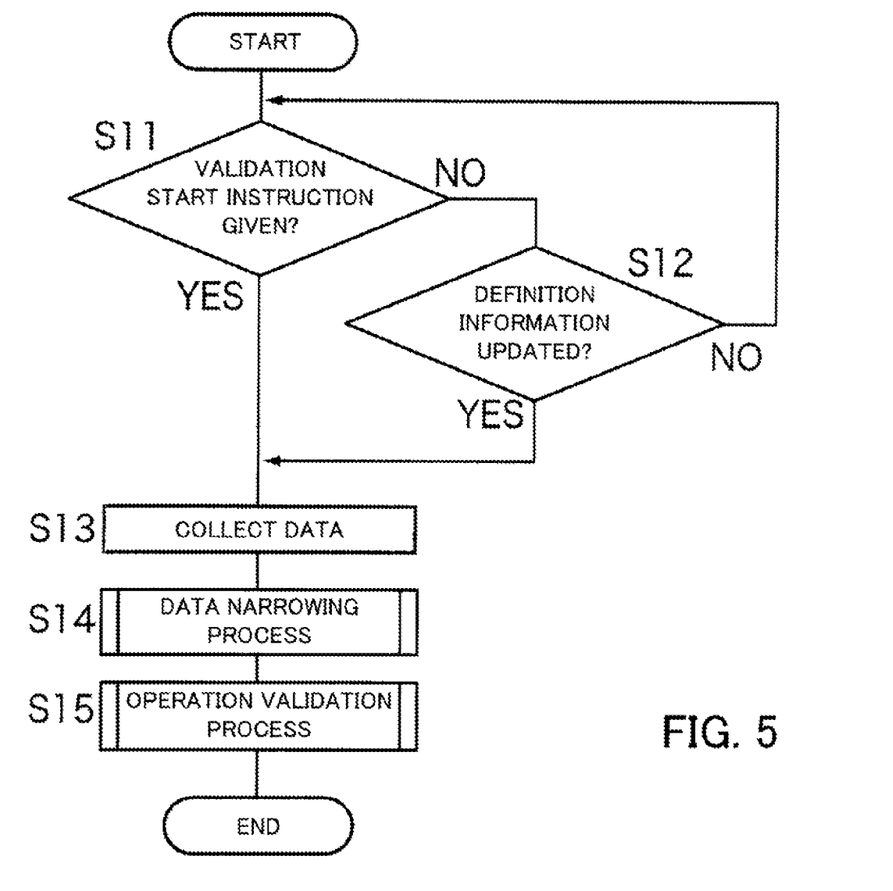
FIG. 5 is a flowchart of a process that the data processing apparatus executes during validation.

Hereinafter, a description will be given of a process that the data processing apparatus 10 executes during validation. FIG. 5 is a flowchart of the process executed by the data processing apparatus 10 during validation. First, the data processing apparatus 10 determines whether or not a validation start instruction has been given (step S11). Whether or not a validation start instruction has been given is determined by determining whether or not the data processing apparatus 10 has detected that it is a predetermined time, that a processing load on the operation processor 14 is small, or the like, or whether or not the administrator of the data processing apparatus 10 has given a validation start instruction by manual entry.

If a validation start instruction has not been given (NO to the step S11), it is determined whether or not the definition information 122 has been updated (step S12). A known method can be used for determining whether or not the update has been performed. For example, by storing the definition information 122 as initial settings or last updated settings, and determining whether or not the current definition information 122 matches the stored definition information 122, it is possible to check whether or not the update has been performed. If it is determined that the definition information 122 has not been updated (NO to the step S12), the present process returns to the step S11.

If a validation start instruction has been given (YES to the step S11), or if it is determined that the definition information 122 has been updated (YES to the step S12), the data processing apparatus 10 collects data input from the data input apparatus 20 (step S13). The form of data input from the data input apparatus 20 may be set as desired. In the present embodiment, it is assumed that data of records each formed by a plurality of items is collected. The data may be collected from the data input apparatus 20 on a record-by-record basis, or a plurality of records may be collectively collected. The collected data is recorded e.g. in a single file (input file 123).

Next, the data processing apparatus 10 executes a data narrowing process according to the current definition information 122 (step S14). Although the data narrowing process will be described in detail hereinafter, in this process, the collected data is narrowed down by analyzing the current definition information 122 and extracting records or items affected by the definition information 122.

The data narrowed down in the data narrowing process is recorded e.g. in a single file (test input file 126).

Then, the data processing apparatus 10 performs validation of the operation being performed based on the current definition information 122, using the data narrowed down by the data narrowing process (i.e. data recorded in the test input file 126) (step S15). Although the operation validation process executed in this step will be described in detail hereinafter, in this process, the processing according to the current definition information 122 is executed using the data recorded in the test input file 126, whereby an output file is generated and is transmitted to a transfer destination (virtual transfer destination) which is virtually provided. By making it possible to compare the data recorded in the input file 123 with the data transferred to the virtual transfer destination, it is possible to validate whether or not the operation being performed based on the definition information 122 is good.

Figure 6:
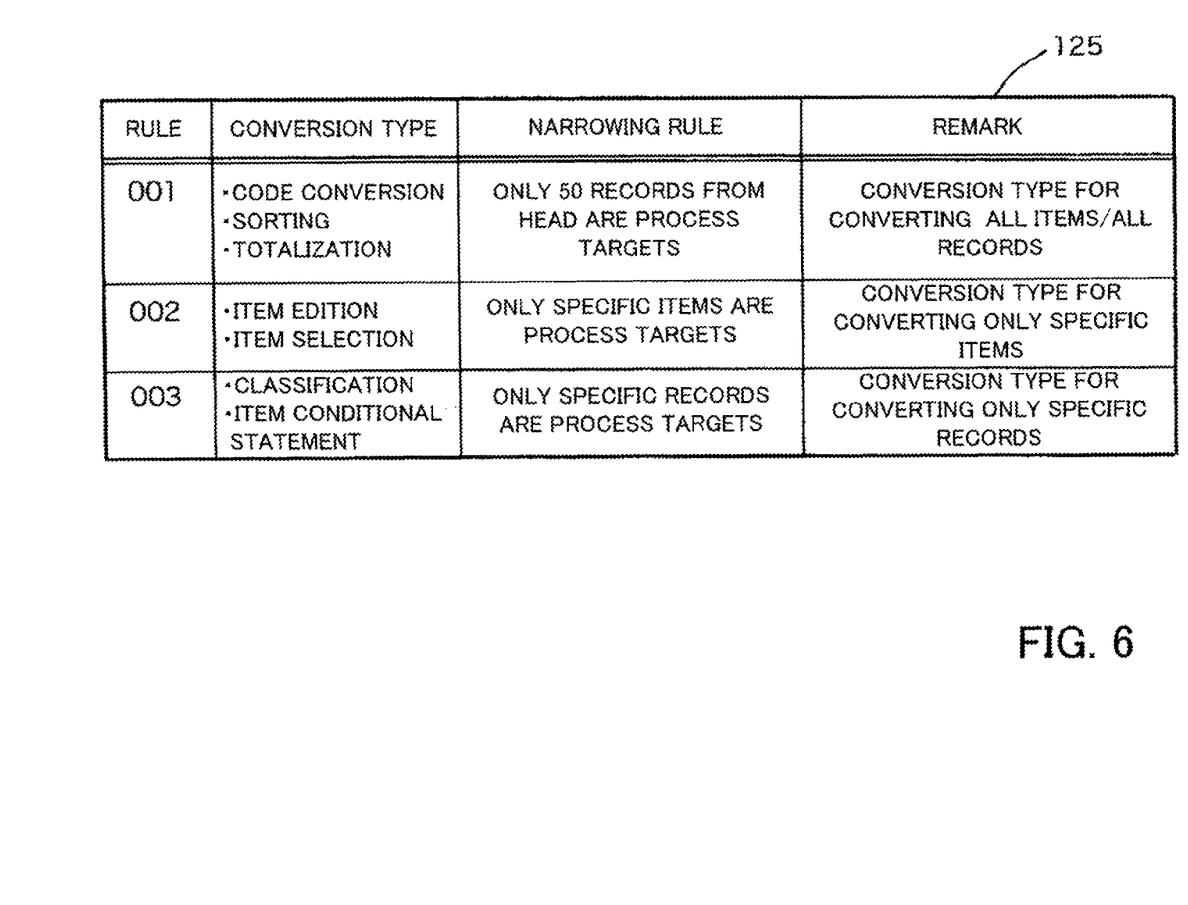
FIG. 6 is a schematic diagram illustrating an example of a narrowing rule table which defines rules for narrowing down data.

Next, a description will be given of the data narrowing process executed during the operation validation. The data is narrowed down according to rules determined in advance. FIG. 6 is a schematic diagram illustrating an example of the narrowing rule table 125 which defines rules for narrowing down data. In the example illustrated in FIG. 6, three narrowing rules are specified.

A rule "001" is defined for conversion types that process all items and all records, such as code conversion, sorting, and totalization, and specifies that only 50 records from the head are process targets.

A rule "002" is defined for conversion types that processes only specific items, such as item editing and item selection, and specifies that only specific items are process targets.

A rule "003" is defined for conversion types that processes only specific records, such as classification and conversion dependent on item conditions, and specifies that only specific records are process targets.

Figure 7:
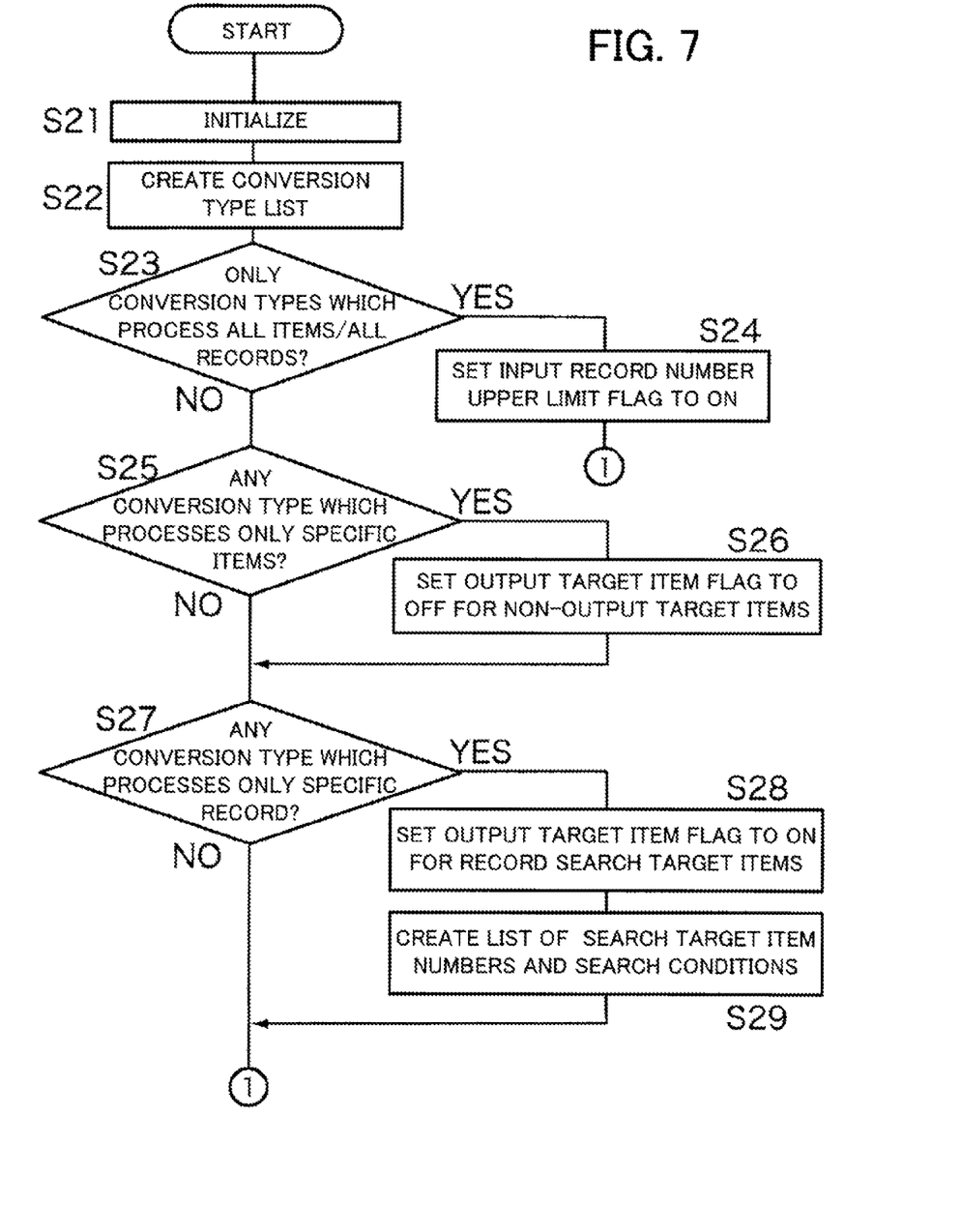
FIG. 7 is a flowchart of a data narrowing process.
Figure 8:
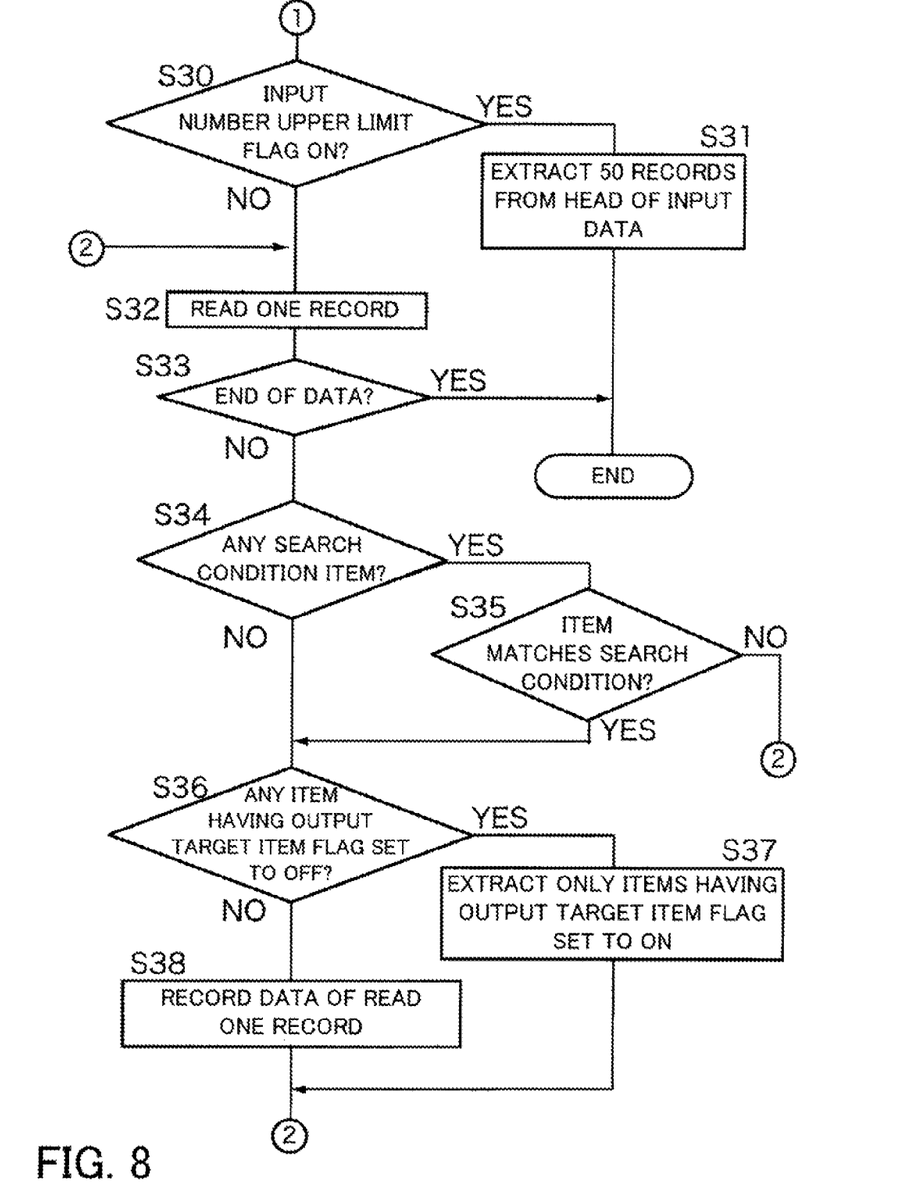
FIG. 8 is a flowchart of the data narrowing process.

In the data processing apparatus 10, data is narrowed down according to the data narrowing rules described as above. FIGS. 7 and 8 are a flowchart of the data narrowing process. The data processing apparatus 10 performs initialization of the data narrowing process (step S21). More specifically, the data processing apparatus 10 allocates, in a memory (e.g. the storage unit 12), an area for setting a list of conversion types to be validated, an area for an input record number upper limit flag, an area for setting a process target/non-process target flag for each of input data items (all items) of the conversion process flow, and an area for a list of item numbers and search conditions for searching for process-target records.

FIGS. 9A to 9D are schematic diagrams illustrating examples of memory areas allocated by initialization.

Figure 9A:
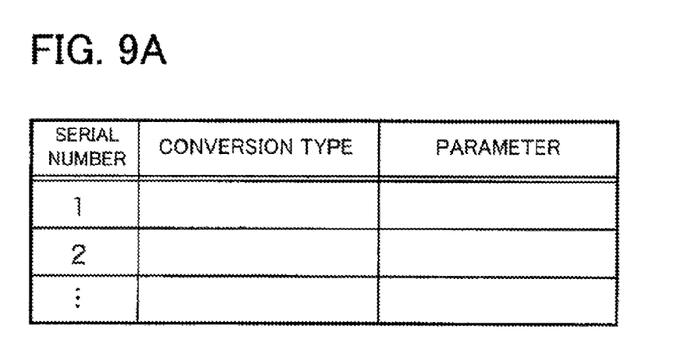
FIGS. 9A to 9D are schematic diagrams illustrating examples of memory areas allocated by initialization.

FIG. 9A illustrates an example of the area for setting the list of the conversion types (hereinafter referred to as the conversion type list-setting area). In the conversion type list setting area, the types of conversion extracted from the current definition information 122 are stored in association with parameters used in the respective conversion operations. In the conversion type list-setting area, the types of conversion extracted from the definition information of the operation definition and parameters are recorded, as will be described hereinafter.

Figure 9B:
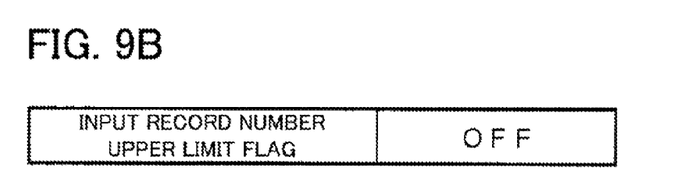

FIG. 9B illustrates an example of the area for the input record number upper limit flag. An initial value of this flag is set to off, and is changed to on when the upper limit of the number of input records is set in the data narrowing process.

Figure 9C:
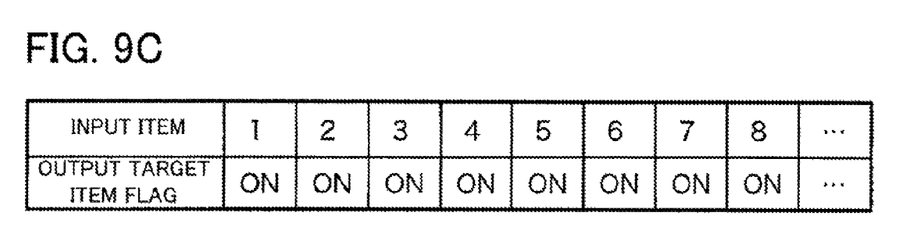

FIG. 9C illustrates an example of the area for setting the process target/non-process target flag. An output target item flag, i.e. the process target/non-process target is initially set to on, and is set to off when an item is a non-output target item.

Figure 9D:
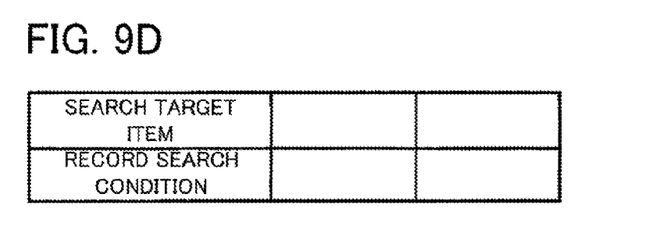

FIG. 9D illustrates an example of the area for the list of item numbers and search conditions for searching for process-target records. In this list area, an item number of a target item is stored in association with conditions for searching for records. The number of target items is set as appropriate based on the definition information.

After initializing the data narrowing process in the step S21, the operation validation unit 15 extracts conversion types appearing in the current definition information 122, and writes the extracted conversion types in the conversion type list setting area allocated in the memory by initialization, to thereby create a conversion type list (step S22). The conversion type list is thus created based on the definition information 122. For example, by extracting <seqno> as a serial number, extracting <cnvseq> as a conversion type, and extracting <cond> as a parameter from the definition information illustrated in FIGS. 2 and 3, it is possible to create a conversion type list as illustrated in FIG. 10A.

Figure 10A:
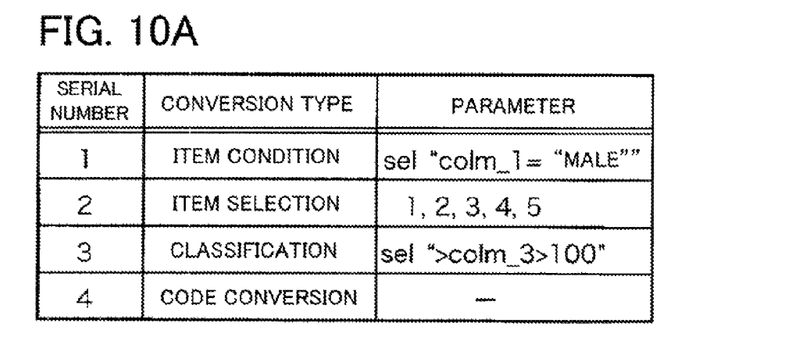
FIGS. 10A to 10D illustrate examples of conversion type lists.

The example of the conversion type list illustrated in FIG. 10A indicates that conversions according to the item condition, item selections, classifications, and code conversions are extracted from the current definition information 122, and are stored in respective conversion type lists in association with parameters used in respective processing operations.

Note that when the data narrowing process is executed immediately after the definition information is updated, only the conversion types of which the definition is modified may be extracted and stored in the conversion type list.

Then, the operation validation unit 15 determines whether or not only the conversion types which process all items and all records exist in the conversion type list created by referring to the narrowing rule table 125 (step S23). More specifically, the operation validation unit 15 determines whether or not all of the conversion types in the created conversion type list are included in the rule "001" of the narrowing rule table 125. If it is determined that only the conversion types which process all items and all records exist (YES to the step S23), the input record number upper limit flag is set to on (step S24).

If it is determined that any conversion type which does not process all items and all records exists (NO to the step S23), the operation validation unit 15 determines whether or not any conversion type which processes only specific items exists in the created conversion type list (step S25). More specifically, the operation validation unit 15 determines whether or not any conversion type included in the rule "002" of the narrowing rule table 125 exists in the conversion types of the created conversion type list. If it is determined that at least one conversion type which processes only specific items exists (YES to the step S25), the output target item flag is set to off for the non-output target items (step S26). More specifically, the output target item flag is set to off for parameters other than those associated with conversion types which process the specific items in the conversion type list. In doing this, if a plurality of conversion types apply to the rule "002", the output target item flag is set by the logical sum of these conversion types.

If it is determined that no conversion type which processes only specific items exists (NO to the step S25), or if the setting of the output target item flag is performed in the step S26, the operation validation unit determines whether or not any conversion type which processes only specific records exists in the created conversion type list (step S27). If it is determined that at least one conversion type which processes only specific records exists (YES to the step S27), the output target item flag is set to on for the record search target items (step S28). Further, a list of search target items and record search conditions is generated (step S29). More specifically, the search target items and record search conditions are generated from parameters associated with the conversion types included in the rule "003" of the narrowing rule table 125, in the conversion type list.

Figure 10B:
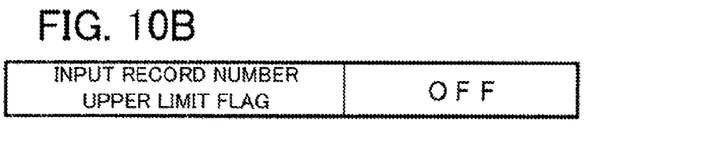
Figure 10C:
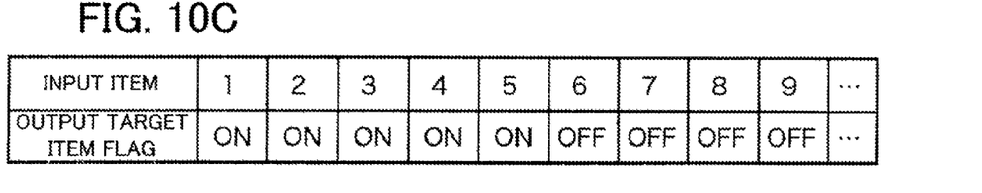
Figure 10D:
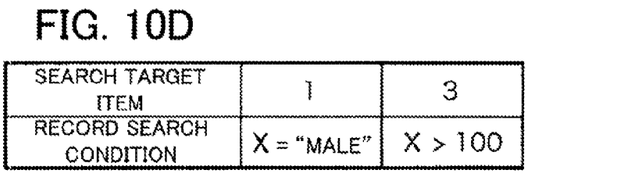

FIGS. 10B, 10C, and 10D illustrate the input record number upper limit flag, the process target/non-process target flag, and a list for searching for process-target records, which are created based on the definition information 122 (see FIGS. 2 and 3) and the narrowing rule table 125 (see FIG. 6), respectively.

If the step S24 or S29 is executed, or if it is determined in the step S27 that no conversion type which processes only specific records exists (NO to the step S27), the data is narrowed down as described hereinbelow by referring to the flags etc. set in the respective memory areas. The narrowed data is stored in a single file (test input file 126) as the validation data.

First, the operation validation unit 15 determines whether or not the input record upper limit flag is on (step S30). If the input record upper limit flag is on (YES to the step S30), 50 records from the head are extracted from the input data (step S31), and are recorded in the test input file 126.

If the input record upper limit flag is off (NO to the step S30), the input data is read one record by one record (step S32). Then, the operation validation unit 15 determines whether or not it is the end of data (step S33), and if it is determined that it is the end of data (YES to the step S33), the present data narrowing process is terminated.

If it is determined that it is not the end of data (NO to the step S33), the operation validation unit 15 determines whether or not any item designated as the search condition item is included in the data of the read one record (step S34). If it is determined that at least one item designated as the search condition item is included (YES to the step S34), it is determined whether or not the item matches the search condition (step S35). If it is determined that the item does not match the search condition (NO to the step S35), the present process returns to the step S32.

If it is determined in the step S34 that no item designated as the search condition item is included (NO to the step S34), or if it is determined in the step S35 that the included item matches the search condition (YES to the step S35), the operation validation unit 15 determines whether or not any item having the output target item flag set to off exists (step S36). If it is determined that at least one item having the output target item flag set to off exists (YES to the step S36), only item having the output target item flag set to on is extracted out of the data of the one record read in the step S32 (step S37), and is recorded in the test input file 126.

Further, if it is determined that no item having the output target item flag set to off exists (NO to the step S36), the data of the one record read in the step S32 is recorded in the test input file 126 (step S38).

After execution of the step S37 or S38, the operation validation unit 15 returns the present process to the step S32, whereby the input data is narrowed down with respect to all of the records included in the input data.

Figure 11A:
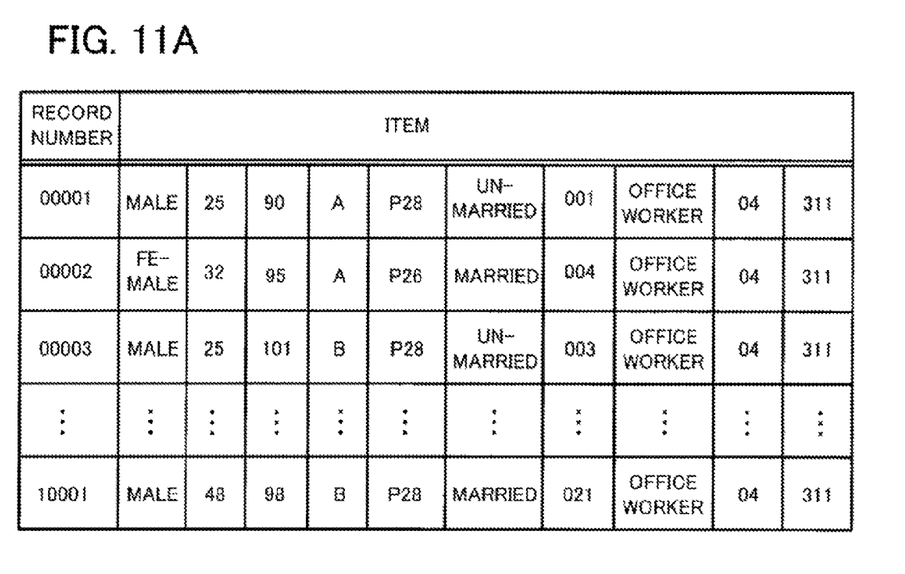
FIGS. 11A and 11B illustrate examples of data narrowed down when a rule "001" is applied.
Figure 11B:
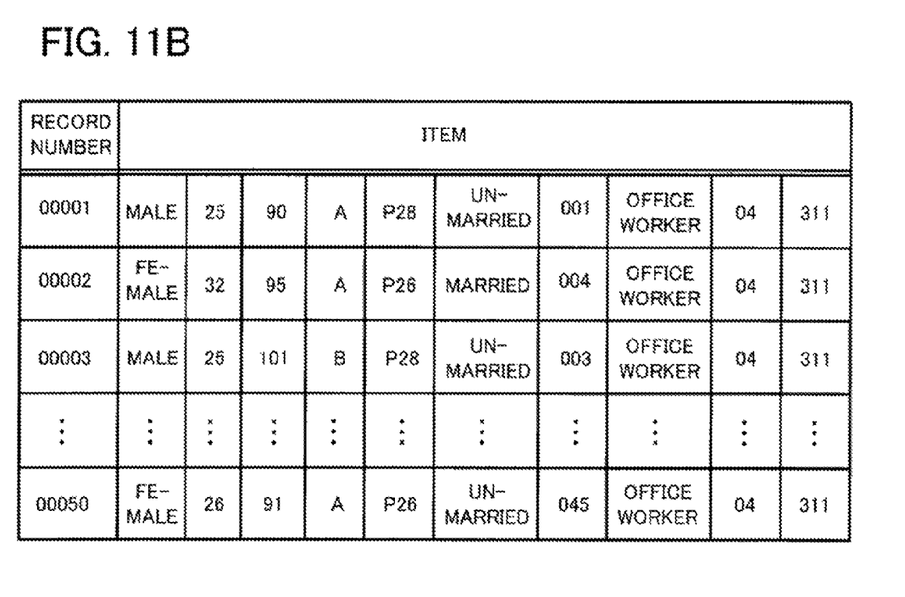

Hereinafter, a description will be given of an example of the application of the data narrowing process. FIGS. 11A and 11B illustrate examples of data narrowed down when the rule "001" is applied. FIG. 11A illustrates an example of the input file 123. The example illustrated in FIG. 11A indicates a file of data which has 10 items per one record and includes a total of 10001 records.

When the rule "001" is applied to the input file 123, i.e. when only the conversion type which processes all items and all records (e.g. code conversion, sorting, and totalization) is defined by the definition information 122, only 50 records from the head are set as process targets, and hence the resulting narrowed down data is as illustrated in FIG. 11B.

Figure 12A:
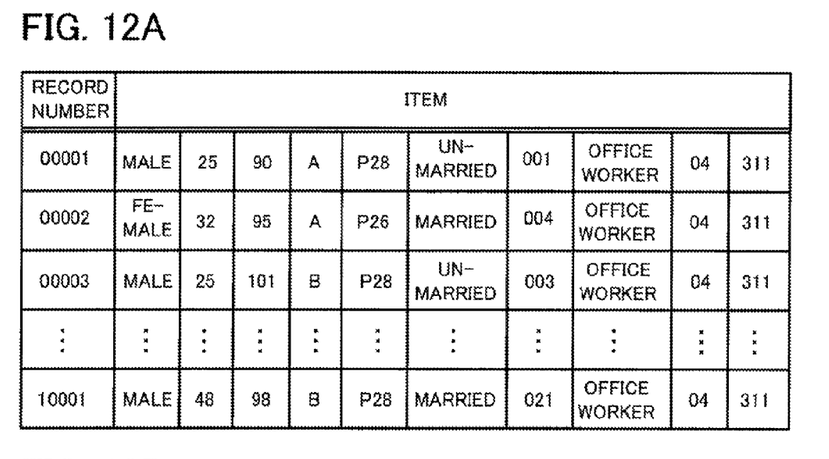
FIGS. 12A to 12D illustrate examples of data narrowed down when both of a rule "002" and a rule "003" are applied.
Figure 12B:
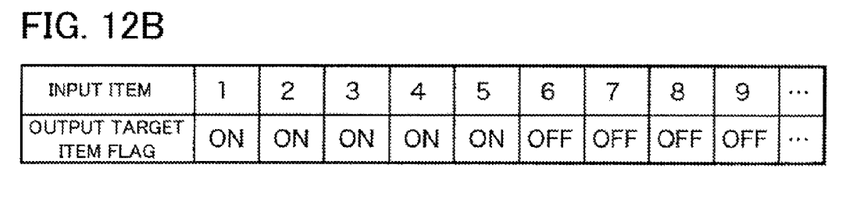
Figure 12C:
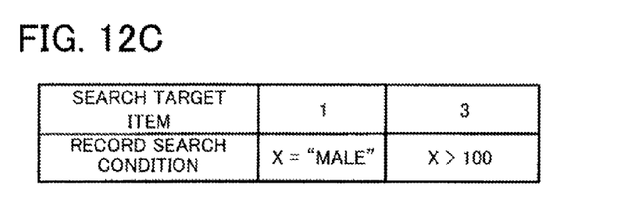

FIGS. 12A to 12D illustrate examples of data narrowed down when both of the rule "002" and the rule "003" are applied. FIG. 12A illustrates an example of the input file 123. The example illustrated in FIG. 12A indicates a file of data which has 10 items per one record and includes a total of 10001 records. FIG. 12B illustrates the process target/non-process target flag for each input item, and indicates that the first, second, third, fourth, and fifth items are output targets. FIG. 12C illustrates a search condition of an item to be retrieved, and indicates a condition that the data of the first item is equal to "male" and third item is larger than 100.

Figure 12D:
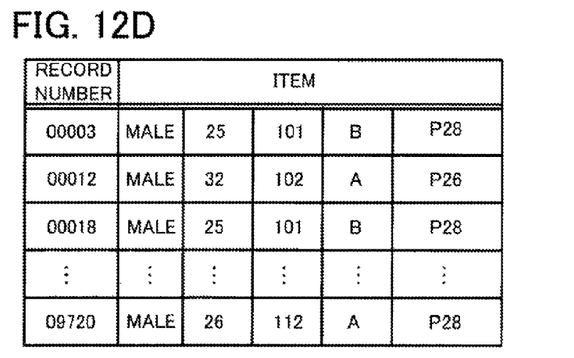

When the rule "002" and the rule "003" are applied to the input file 123, only specific items (the first, second, third, fourth, and fifth items) are extracted according to the rule "002", and only specific records (the data of the third item is larger than 100) are extracted according to the rule "003", and hence, for example, the resulting narrowed down data is as illustrated in FIG. 12D. Note that the five items of the input file 123 illustrated in FIG. 12A indicate e.g. input values for the function, and FIG. 12D indicates a result of the application of the function.

Figure 13:
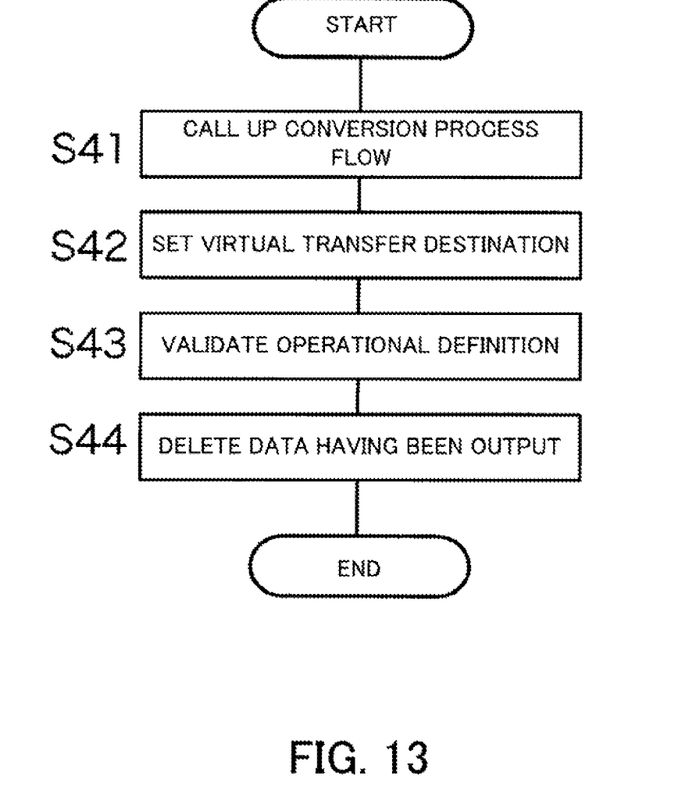
FIG. 13 is a flowchart of an operation validation process that the data processing apparatus executes.

Next, a description will be given of the operation validation process. FIG. 13 is a flowchart of the operation validation process executed by the data processing apparatus 10. First, the operation validation unit 15 calls up the conversion process flow from the current definition information 122 (step S41), and sets the transfer destination of the data processed by the operation validation unit 15 to a virtual transfer destination provided within the apparatus (e.g. a virtual transfer destination provided in the storage unit 12) (step S42).

In this process, the conversion process flow indicates a sequence of processing operations executed by the operation processor 14 when the data processing apparatus 10 is in operation. In the actual operation, the output file 124 generated by the operation processor 14 is output to the output destination specified by the definition information 122 (the data output apparatus 30, or a database or a file within the data output apparatus 30). On the other hand, during operation validation, the output file 124 is output not to the actual output destination, but to the virtual transfer destination provided within the data processing apparatus 10.

For example, if the output destination specified by the definition information 122 is the data output apparatus 30, the apparatus name of the transfer destination is updated to the name of the data processing apparatus, and the same output processing as that in the operation is executed.

Further, if the output destination specified by the definition information 122 is the database within the data output apparatus 30, after the table name defined by the definition information 122 is updated to a table name to which "a serial number" is added, and a database table having the updated table name is created in the virtual transfer destination provided within the storage unit 12, the data is output to the database table of the virtual transfer destination. The similar processing is performed when the output destination specified by the definition information 122 is a file, i.e. after the file name defined by the definition information 122 is updated to a file name to which "a serial number" is added, and a file having the updated file name is created in the virtual transfer destination provided within the storage unit 12, the data is output to the file of the virtual transfer destination.

Then, the operation validation unit 15 performs validation of the operational definition based on the data output to the virtual transfer destination (step S43). For example, validation of the operational definition is performed by causing the operation validation unit 15 to execute a comparison in details between data recorded in the output file 124 and data output to the virtual transfer destination to thereby cause the same to determine whether or not the process according to the operational definition has been completed. Further, validation of the operational definition may be performed by causing the display unit 18 to display the data recorded in the test input file 126 and the output file 124, and causing the administrator to determine whether or not the process according to the operational definition has been completed.

Then, the operation validation unit 15 deletes the data having been output to the virtual transfer destination (step S44), followed by terminating the operation validation process according to the present flowchart.

As described above, in the present embodiment, even when the test validation is performed by directly using the operational definition, it is possible to validate the operational definition, insure resources during the operation, and confirm the results of validation without increasing the load on the apparatus.

Further, when the destination of output of data by the operation processor 14 is output to a database equipped in the computer of the user or is transferred to a file, it is possible to validate the output definition and verify the validity of the output data without updating user resources, since the virtual transfer destination is provided for the operation validation process.

By narrowing down input data used for operation during test validation to only data required for the definition validation, it is possible to validate the operational definition and the input data within a short time without increasing load on the apparatus. Further, the input data for use in the operation is used, which eliminates the necessity of performing manual narrowing-down of data, and it is therefore possible to prevent occurrence of a manual operation error.

Further, when the update of the definition occurs, the input data used in the operation is narrowed down to only data required for validation of the definition difference, which makes it possible to validate the operational definition and the input data within a short time while reducing the load on the apparatus. As a result, when confirming results of conversion of the test input data, it is only required to confirm results of a small amount of data, and hence it is possible to reduce time required for the confirmation, compared with when confirming results of conversion of a large amount of input data.

According to the present invention, even when test validation is performed by directly using operational definition, it is possible to create the validation data of the operational definition, insure resources during the operation, and confirm results of the test validation without increasing the load on the machine.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A data processing apparatus comprising:
a memory configured to store operation information that defines operation of the data processing apparatus and a plurality of narrowing rules for narrowing down data, the narrowing rules corresponding to different types of data conversions to be applied to the data; and
one or more processors configured to perform a procedure comprising:
receiving input data;
generating test input data by narrowing down the received input data according to search condition information that is produced by analyzing the operation information based on the narrowing rules stored in the memory, in terms of the types of data conversions specified in the operation information; and
processing the test input data according to the operation information to generate output data.

2. The data processing apparatus according to claim 1, wherein the procedure further comprises:
outputting the output data to a virtual output destination provided within the processing apparatus; and
comparing the output data with the data output to the virtual output destination.

3. The data processing apparatus according to claim 1, wherein the search condition information includes a conversion type list that enumerates data conversions specified in the operation information.

4. The data processing apparatus according to claim 1, wherein one of the narrowing rules specifies extraction of a predetermined number of records from a topmost portion of the input data when the data conversion corresponding to the one of the narrowing rules applies to all records in the input data.

5. A computer-readable, non-transitory storage medium storing a program causing a computer with a memory to execute a process comprising:
storing, in the memory, operation information that defines operation of the computer and a plurality of narrowing rules for narrowing down data, the narrowing rules corresponding to different types of data conversions to be applied to the data;
receiving input data;
generating test input data by narrowing down the received input data according to search condition information that is produced by analyzing the operation information based on the narrowing rules stored in the memory, in terms of the types of data conversions specified in the operation information; and
processing the test input data according to the operation information.

* * * * *